Figure 1:
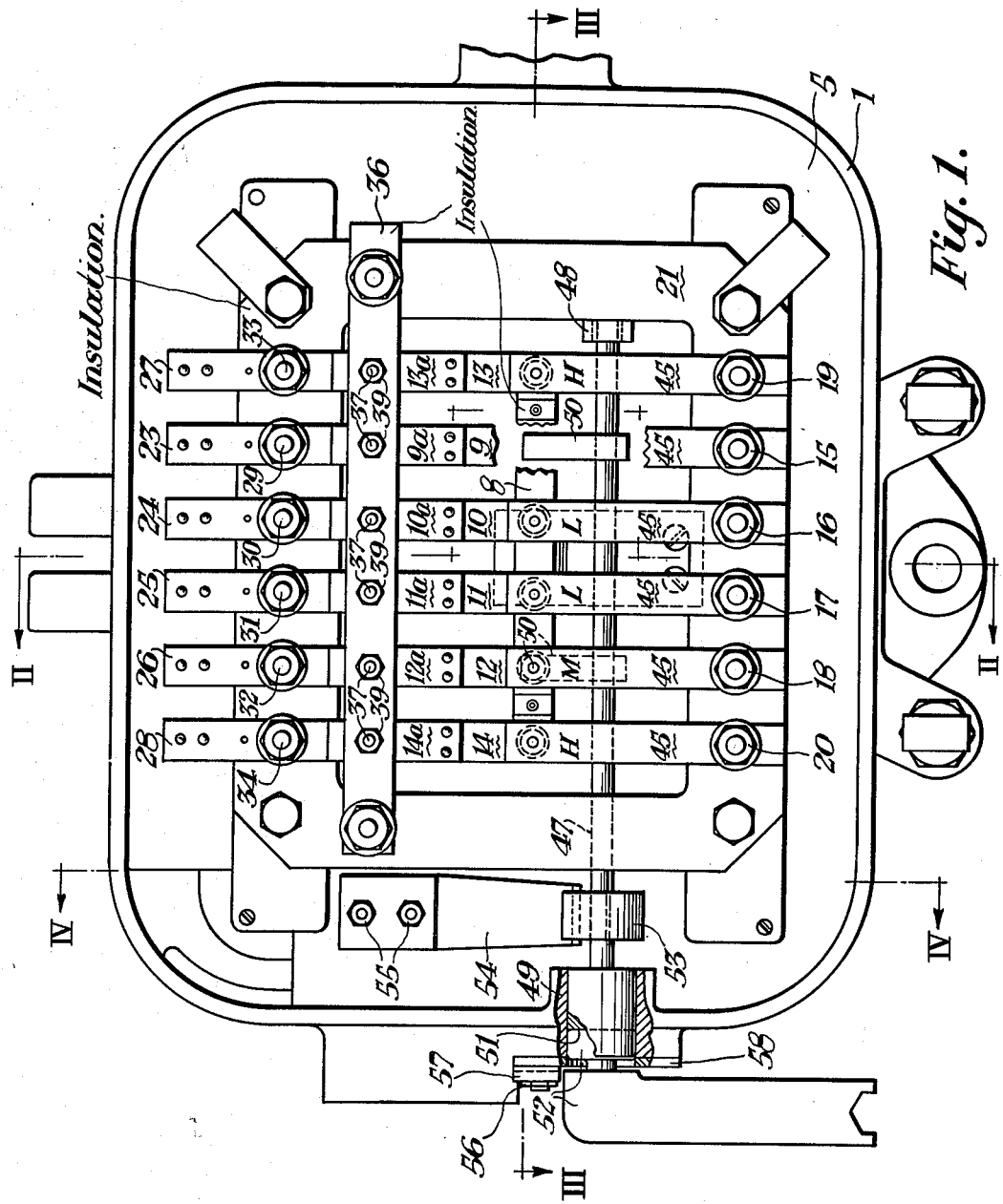

Jan. 10, 1956

H. L. BONE ET AL 2,730,584

AUXILIARY CONTACT ACTUATOR FOR TRAIN CONTROL GOVERNORS

Filed April 26, 1952

3 Sheets-Sheet 1

INVENTORS
Herbert L. Bone and
Harold C. Clausen.
BY
W. L. Stout.
THEIR ATTORNEY

Jan. 10, 1956  H. L. BONE ET AL  2,730,584
AUXILIARY CONTACT ACTUATOR FOR TRAIN CONTROL GOVERNORS
Filed April 26, 1952  3 Sheets-Sheet 2

INVENTORS
Herbert L. Bone and
Harold C. Clausen.
BY W. L. Stout.
THEIR ATTORNEY

Jan. 10, 1956  H. L. BONE ET AL  2,730,584
AUXILIARY CONTACT ACTUATOR FOR TRAIN CONTROL GOVERNORS
Filed April 26, 1952  3 Sheets-Sheet 3

INVENTORS
*Herbert L. Bone and
Harold C. Clausen.*
BY
W. L. Stout.
THEIR ATTORNEY

United States Patent Office 2,730,584
Patented Jan. 10, 1956

2,730,584

AUXILIARY CONTACT ACTUATOR FOR TRAIN CONTROL GOVERNORS

Herbert L. Bone, Forest Hills, and Harold C. Clausen, Penn Township, Allegheny County, Pa., assignors to Westinghouse Air Brake Company, Wilmerding, Pa., a corporation of Pennsylvania Application April 26, 1952, Serial No. 284,666

2 Claims. (Cl. 200—42)

Our invention relates to a contact actuator, and in particular to an auxiliary contact actuator for train control governors.

Train control governors are incorporated in train control systems and act in conjunction with the cab signaling system to control the air brake system of the train. The cab signaling system provides visual signals of the traffic conditions ahead of the train, while the train control governor enforces obedience to changes in the cab signal indications which require a reduction in train speed. The governors are usually operatively connected to an axle of the locomotive, and include a set of electrical contacts actuated by the push rod of the governor. The governor contacts are interposed in the electrical circuits of the cab signaling system and are each individually adjusted so as to be actuated by the governor at a predetermined speed of the locomotive. The actuation of a particular electrical contact at a predetermined speed which is in excess of the maximum permissible speed as indicated by the cab signal will set off an audible warning signal. An acknowledgement of the warning signal within a specified time by a suitable reduction in the speed of the train will cut off the warning signal. Should the warning go unheeded, a continued actuation of the electrical contact by the governor will cause the brakes to be applied automatically to stop the train.

An object of our invention is to provide an inexpensive auxiliary means for selectively actuating the contacts of a train control governor of the type described with the train standing still so as to enable the circuits and apparatus controlled by the governor to be checked to ascertain if they are operating properly.

According to our invention, the auxiliary contact actuator comprises a shaft provided with means to selectively actuate the electrical contacts of the train control governor when the shaft is rotated to predetermined positions together with means for manually roating the shaft from outside the governor housing to said predetermined positions. Acting in conjunction with the shaft are suitable means for yieldably holding the shaft in any of said predetermined positions. Thus, with the train standing still, an inspector can rotate the shaft to the predetermined positions to thereby actuate the contacts and hence ascertain that the circuits are properly operating.

Other objects and characteristic features of our invention will become apparent as the description proceeds.

We shall describe one form of train control governor embodying our invention, and shall then point out the novel features thereof in claims.

Figure 2:
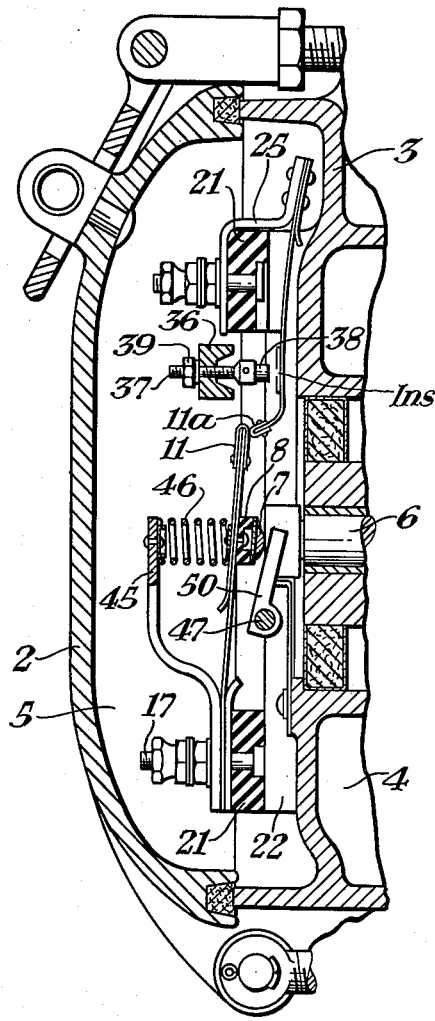
Figure 4:
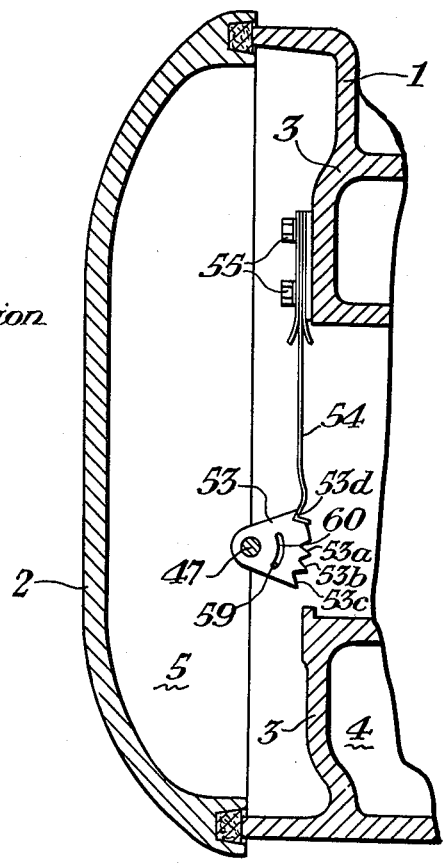
Figure 3:
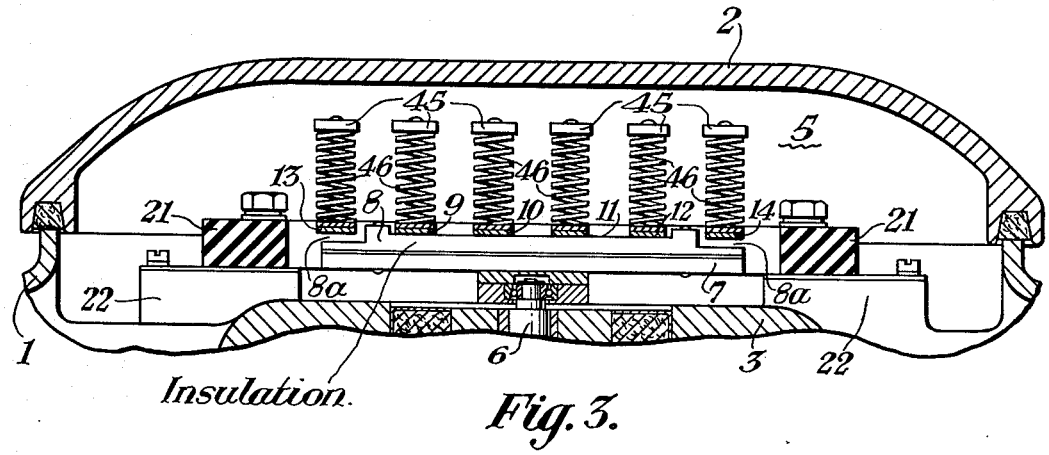
Figure 5:
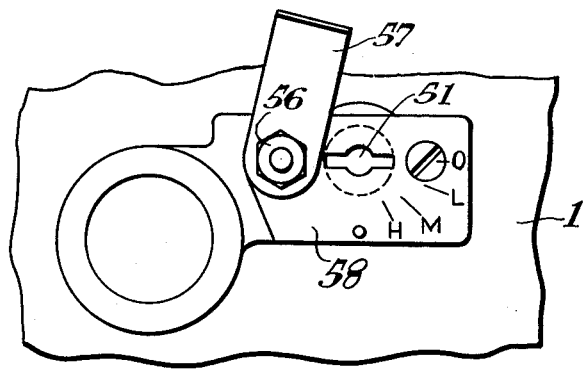

In the accompanying drawings, Fig. 1 is a front view of a train control governor provided with an auxiliary contact actuator embodying our invention, the cover being removed to better illustrate the details of construction. Fig. 2 is a sectional view taken substantially along the line II—II of Fig. 1. Fig. 3 is a sectional view taken along the line III—III of Fig. 1. Fig. 4 is a detailed sectional view of the detent plate assembly taken on the line IV—IV of Fig. 1. Fig. 5 is a front view of the keyway and dust plate assembly.

Similar reference characters refer to similar parts in each of the several views.

Referring now to the drawings; the train control governor here shown is encased in a housing 1 which is divided into two compartments 4 and 5 by means of a partition 3. Compartment 4 houses a centrifuge assembly which may be of any suitable type such, for example, as that shown and described in a copending application for Letters Patent of the United States, Serial No. 52,095, filed on September 30, 1948, by Herbert L. Bone for Speed Responsive Devices and which issued as Patent No. 2,361,025 on March 10, 1953. Because the centrifuge assembly forms no part of our present invention, it has not been shown and will not be described. Compartment 5 contains the electrical circuit controller contacts and our contact actuator mechanism. Fastened to the housing 1 over compartment 5 is a removable cover 2.

A push rod 6 is actuated by the previously referred to centrifuge assembly in such manner that it will move toward the left as viewed in Fig. 2 with increases in the speed of the centrifuge assembly. The push rod 6 actuates by suitable means a hard steel bar 7 secured to an insulating member 8 which is in turn riveted to movable contact fingers 9, 10, 11 and 12, respectively. Two end movable contact fingers 13 and 14 are not secured to the insulating member 8 for reasons which will be made clear presently. These movable contact fingers 9–14 are secured by means of terminal posts 15, 16, 17, 18, 19 and 20, respectively, to an insulating support 21 attached to bosses 22 formed on the partition 3. The movable contact fingers 9–14 cooperate with fixed contact fingers 9a–14a, respectively, to form associated contacts 9—9a to 14—14a. The fixed contact fingers are secured at their free ends to associated supporting brackets 23, 24, 25, 26, 27 and 28, fastened by means of terminal posts 29, 30, 31, 32, 33 and 34, to insulating support 21. Mounted on insulating support 21 is a bracket 36 which carries a group of set screws 37. Each of the set screws 37 is provided with a lock nut 39.

Attached to the terminal posts 15 to 20, inclusive, associated with the movable contact fingers 9–14 are brackets 45, one for each movable contact finger, which brackets extend parallel to and are spaced from the movable contact fingers 9–14. Retained between each bracket 45 and its associated movable contact finger is a coil spring 46. The coil springs associated with movable contact fingers 9, 10, 11 and 12, bias the steel bar 7 into engagement with push rod 6. In accomplishing this, the coil springs 46 bias associated movable contact fingers 9, 10, 11 and 12 toward their associated fixed contact fingers 9a–12a. The coil springs associated with movable contact fingers 13 and 14 do not bias bar 7 into engagement with push rod 6 for reasons which will be presently explained. These springs do, however, bias the movable contact fingers 13 and 14 into engagement with their corresponding fixed contact fingers 13a and 14a.

In addition to the bias afforded by coil springs 46, the flexible fixed contact fingers 9a–14a are biased by their own resiliency into contact with their respective movable contacts fingers 9–14. The proper bias may be established and adjusted in the case of each fixed contact finger by properly bending the end of the bracket 23—28 which supports the fixed contact finger. The set screws 37 carry insulated tips 38 which at times engage the respective fixed contact fingers 9a–14a and limit their movement toward the movable contact fingers 9–14.

The setting of any of the set screws 37 determines the speed at which the associated contact opens. As indicated by letters L, M and H, in Fig. 1, the contacts 10—10a and 11—11a are arranged to open at a relatively low speed, the contacts 9—9a and 12—12a at a medium speed, and the contacts 13—13a and 14—14a at a high speed. For example, referring to Fig. 2, it will be seen that as the speed of the centrifuge increases and moves the push rod to the left, the speed at which the contact 11—11a opens is determined by the point at which the motion of fixed contact finger 11a is stopped by the insulated tip 38 of the associated set screw 37.

As was pointed out heretofore, the outer movable contact fingers 13 and 14, which are the high speed contact fingers, are not rigidly attached to the insulating member 8, as can be seen in Fig. 3. Instead, the insulating member 8 is provided with recesses 8a which are in alignment with the movable contact fingers 13 and 14. Because of this construction, the movable contact fingers 13 and 14 are engaged and deflected from their normal positions only when a certain high speed is reached, approaching the speed at which the contacts 13—13a and 14—14a are to be opened. This construction avoids excessive deflection of the fixed contact fingers 13a and 14a which would occur when the speed responsive device is stationary if the movable fingers 13 and 14 were rigidly attached to the insulating member 8.

The portion of the governor thus far described is well known, and if a more complete description is desired, reference may be had to the aforementioned Bone application.

The auxiliary contact actuating mechanism embodying our present invention comprises a contact actuating shaft 47 mounted in bearings 48 and 49 which are in turn mounted in the housing 1. This shaft extends parallel to the insulating member 8 and has affixed thereto camming fingers 50 which cooperate with the insulating member 8 to at times actuate the governor contacts independently of the centrifuge mechanism of the governor.

Referring now particularly to Fig. 1, disposed in the side of the housing 1 at the extreme left end of contact actuator shaft 47 is a keyway 51 which receives a key 52. Affixed to the contact actuator shaft 47 is a detent plate 53 (see Fig. 4). A detent 54 is affixed at one end to the housing 1 by suitable bolts 55, and is provided at the other end with a V-shaped portion which cooperates with the notches of the detent plate 53. The detent plate 53 and the detent 54 are so adjusted that when the contact actuator shaft is rotated so the detent 54 drops into the first or low speed notch 53a of detent plate 53, the camming fingers 50 will have pushed the insulating member 8 a distance sufficient to actuate the low speed contacts 10—10a and 11—11a. The detent plate's medium and high speed notches 53b and 53c are similarly positioned so that when the detent 54 is in these notches, the camming fingers 50 will actuate the medium and high speed contacts, respectively. A normal or "off" notch 53d is also provided in detent plate 53 to hold the contact actuator in its normal position in which the camming fingers are out of engagement with the bar 8 when the contact actuator is not being used. This prevents the contact actuator from interfering with the normal operation of the governor when the contact actuator is not in use. A slot 60 in detent plate 53 and a stop 59 coact to limit the rotation of shaft 47.

Mounted on housing 1 at the entrance to the keyway 51 is a plate 58 with markings "L," "M" and "H" on it. These markings are so made that when key 52 lines up with the "L" mark, detent 54 is in the low notch 53a of detent plate 53. The "M" and "H" markings indicate the position which the key occupies when the detent 54 is in the medium and high notches 53b and 53c, respectively, of detent plate 53. Pivotally mounted on the outside of the housing 1 is a dust shield 57 which is normally rotated to a closed position where it closes the outside of the keyway 51 to prevent foreign matter from entering the housing 1 through the keyway 51, but which can be rotated to an open position in which access to the keyway 51 by the key 52 is provided.

When it is desired to check the circuits controlled by the circuit controller of the governor, the locomotive upon which the governor is mounted is run on to a test section of track where coded currents of the type to which the train control equipment is intended to respond can be supplied thereto. The dust plate 57 is then rotated to the open position so as to afford entrance of key 52 into keyway 51. Cam actuator shaft 47 is rotated by turning key 52 until detent 54 drops into the first or low notch 53a of detent plate 53 as indicated by key 52 lining up with the "L" mark on plate 58. With the shaft so rotated, camming fingers 50 will have moved steel bar 7 and insulating member 8 a distance sufficient to open the low speed contacts 10—10a and 11—11a, which is the position these contacts normally occupy when the train is traveling at a low speed. The test section of track is then supplied with current of the proper character to impose a stop indication on the cab signal equipment. With this current being supplied to the cab signal equipment, if the control circuits are operating properly, a stop indication will be received and the warning alarm will sound.

Checking the medium speed contacts 9—9a and 12—12a can be accomplished in the same manner as that just described for checking the low speed contacts. The contact actuator shaft 47 is rotated by turning key 52 so that detent 54 falls into the second or medium notch 53b of detent plate 53 as indicated by the key 52 lining up with the "M" marking of plate 58. This rotation of the shaft 47 actuates the medium speed contacts to the same positions these contacts normally occupy when the train is traveling at a medium speed. A coded current of the proper character to cause the cab signaling equipment to display a slow speed indication (usually 75 cycles per minute) is supplied to the test track. If the control circuits are operating properly, the warning signal will sound. With the shaft 47 rotated so as to open the high speed contacts 13—13a and 14—14a, which is the position these contacts normally occupy when the train is traveling at a high speed, and a code current of the proper character to impose a medium speed indication on the cab signal equipment is supplied to the test track (usually 120 cycles per minute), if the control circuits are properly operating, the warning signal will again sound. Thus with the train stationary, the control circuits can be rapidly checked.

It should be noted that keyway 51 and key 52 are of such design that key 52 can only be inserted and withdrawn from the keyway 51 when the shaft 47 is rotated to its "off" or "normal" position, that is, when the detent is in notch 53d. This is particularly desirable so that the inspector cannot withdraw the key leaving some contacts actuated, thus causing improper operation of the cab signal circuits.

Although we have herein shown and described only one form of apparatus embodying our invention, it is to be understood that various changes and modifications may be made therein within the scope of the appended claims without departing from the spirit and scope of our invention.

Having thus described our invention, what we claim is:

1. In a circuit controller of a governor enclosed in a housing provided with an aperture and having contacts adapted to be normally selectively actuated by the governor at predetermined speeds, auxiliary means for actuating said contacts when said governor is stationary comprising a shaft rotatably mounted in said housing and provided with a keyway which is accessible from outside of the housing through said aperture, a key to fit in said keyway for rotating said shaft to predetermined positions from outside of the housing, said key, keyway and aperture being so proportioned that said key is insertable in and withdrawable from said keyway when and only when said shaft is in a normal position in which none of said contacts is actuated, means on said shaft for selectively actuating said contacts when said shaft is rotated to said predetermined positions, and means for yieldably holding said shaft in each of said predetermined positions and in said position in which none of said contacts is actuated.

2. In a circuit controller of a governor having contacts normally selectively actuated by a bar which in turn is actuated by the push rod of the governor, an auxiliary means for actuating said contacts when said governor is stationary comprising a rotatable shaft disposed substantially parallel to said bar, means on said shaft cooperating with said bar to selectively actuate said contacts when said shaft is rotated to predetermined positions, means for rotating said shaft to said predetermined positions, and means for yieldably holding said shaft in each of said predetermined positions and in a position in which none of said contacts is actuated.

References Cited in the file of this patent

UNITED STATES PATENTS

| | | |
|---|---|---|
| 1,127,618 | Hartmann | Feb. 9, 1915 |
| 1,903,586 | Arnold et al. | Apr. 11, 1933 |
| 2,057,525 | Horning | Oct. 13, 1936 |
| 2,208,904 | Knight et al. | July 23, 1940 |
| 2,244,760 | Bone | June 10, 1941 |
| 2,297,652 | Henry | Sept. 29, 1942 |
| 2,334,978 | Wood | Nov. 23, 1943 |
| 2,438,970 | Glogau | Apr. 6, 1948 |